(12) United States Patent
Imig et al.

(10) Patent No.: US 9,171,078 B2
(45) Date of Patent: Oct. 27, 2015

(54) AUTOMATIC RECOMMENDATION OF VERTICAL SEARCH ENGINES

(75) Inventors: Scott K. Imig, Redmond, WA (US); Susan Dumais, Kirkland, WA (US); Robert L. Rounthwaite, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 12/432,699

(22) Filed: Apr. 29, 2009

(65) Prior Publication Data

US 2010/0281012 A1  Nov. 4, 2010

(51) Int. Cl.
*G06F 17/30* (2006.01)

(52) U.S. Cl.
CPC .............................. *G06F 17/30864* (2013.01)

(58) Field of Classification Search
CPC ................................................. G06F 17/30864
USPC .................................................. 707/706, 707
See application file for complete search history.

(56) References Cited

U.S. PATENT DOCUMENTS

| | | | | |
|---|---|---|---|---|
| 6,771,569 | B2* | 8/2004 | Nagata et al. | 369/30.09 |
| 7,058,626 | B1 | 6/2006 | Pan | |
| 7,720,870 | B2* | 5/2010 | Barbosa et al. | 707/796 |
| 2004/0068486 | A1* | 4/2004 | Chidlovskii | 707/3 |
| 2004/0186775 | A1* | 9/2004 | Margiloff et al. | 705/14 |
| 2005/0160083 | A1* | 7/2005 | Robinson | 707/3 |
| 2005/0278321 | A1 | 12/2005 | Vailaya et al. | |
| 2006/0085399 | A1* | 4/2006 | Carmel et al. | 707/3 |
| 2006/0271618 | A1* | 11/2006 | Kokubo et al. | 709/202 |
| 2006/0288001 | A1* | 12/2006 | Costa et al. | 707/5 |
| 2007/0038616 | A1 | 2/2007 | Guha | |
| 2008/0016046 | A1 | 1/2008 | Guha | |
| 2008/0071772 | A1 | 3/2008 | Rosenoff | |
| 2008/0114743 | A1 | 5/2008 | Venkataraman | |
| 2008/0243838 | A1 | 10/2008 | Scott | |
| 2009/0006358 | A1* | 1/2009 | Morris et al. | 707/5 |
| 2009/0055388 | A1* | 2/2009 | Song et al. | 707/5 |
| 2009/0070318 | A1* | 3/2009 | Song et al. | 707/5 |
| 2009/0112781 | A1* | 4/2009 | Heath et al. | 706/21 |
| 2009/0327224 | A1* | 12/2009 | White et al. | 707/3 |
| 2010/0057675 | A1* | 3/2010 | White et al. | 707/3 |

OTHER PUBLICATIONS

Article entitled "Defection Detection: Predicting Search Engine Switching" by Heath et al., dated Apr. 25, 2008.*
Article entitled "A Statistical Method for Estimating the Usefulness of Text Databases" by Liu et al., dated Dec. 2002.*
Article entitled "Enhancing Web Search by Promoting Multiple Search Engine Use", by White et al., dated Jul. 24, 2008.*

(Continued)

*Primary Examiner* — Mahesh Dwivedi
(74) *Attorney, Agent, or Firm* — Steve Wright; Judy Yee; Micky Minhas

(57) ABSTRACT

The automatic search engine recommendation technique described herein automatically recommends topic-specific search engines for user queries. In one embodiment, it automatically matches each query submitted to a non-topic specific or general search engine with one or more vertical search engines using a recommendation model and a set of features. For a given query, one embodiment of the technique suggests vertical search engines and topic-specific search results along with the search results from the general search engine.

20 Claims, 8 Drawing Sheets

(56) References Cited

OTHER PUBLICATIONS

Article entitled "Characterizing and Predicting Search Engine Switching Behavior", by White et al., dated Nov. 6, 2009.*

Altsearchengines.com, Federated search, an alternative definition, Jul. 29, 2007, retrieved Feb. 27, 2009 from http://www.altsearchengines.com/2007/07/29/federated-search-an-alternative-definition/.

* cited by examiner

AUTOMATIC RECOMMENDATION OF VERTICAL SEARCH ENGINES

With the explosive growth of the World Wide Web, or Web, the number of users searching for information has grown exponentially. Typically users search for information using a general purpose search engine that searches the Web for information relevant to a user's query. Search results returned in response to the query are then ranked by the search engine to provide the most relevant information found in order of relevance. The task of ranking search results retrieved in a search process can be briefly described as follows. Given a query, a ranking model measures the relevance of each document to the query, sorts all documents based on their relevance scores, and presents a list of top-ranked (e.g., most relevant ones) to the user.

Topic-specific search engines, called vertical search engines or "verticals", often have much better relevance in their topic than general-purpose search engines such as, for example, Google, Microsoft Corporation's Live.com, or Yahoo. For this reason, users can be more effective when they use vertical search engines and general-purpose search engines in combination. However, users often do not know about vertical search engines related to the topic of their search, and therefore cannot search as effectively as if they did have this information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the automatic search engine recommendation technique described herein automatically recommends topic-specific (e.g., vertical) search engines for a user's query. In one embodiment, the technique automatically matches each query submitted to a non-topic specific or general purpose search engine (or optionally a topic-specific search engine or other means of searching a body of information) with one or more vertical search engines. For a given query, one embodiment of the technique suggests matching vertical search engines and topic-specific results along with the search results from the general purpose search engine. In one embodiment of the automatic search engine recommendation technique, one or more general search engines can also be recommended.

More specifically, in one embodiment of the automatic search engine recommendation technique, a model is determined to automatically associate user search queries with a set of topic-specific search engines using a set of features. This model can be created, for example, by creating a list of known vertical search engines, including data about each vertical search engine (e.g., features) to which an input query can be compared. The data for each vertical search engine can be obtained, for example, from users who allow a search engine, browser, or browser extension to monitor their query and search behaviors. Features may be, for example, search queries issued, unigrams and bi-grams of queries or results returned, or geographic location of a user, among others. Once the model to associate user search queries with a set of vertical search engines is acquired it can be used to automatically recommend vertical search engines in response to any input query. To this end, a new query is input into a general purpose, non-topic-specific search engine (or other searchable body). The user query is mapped to the same set of features that are used to characterize the vertical search engines. The similarity between each vertical search engine of the set of vertical search engines and the input query is computed using the set of features. The topic specific search engines are then ranked based on the similarity computations. The highest ranked vertical search engines are then displayed to a user or the results to the query from the highest ranked vertical search engines are displayed to the user. These results can be displayed in conjunction with results received to the query from the non-topic-specific search engine in which the query was entered.

In one embodiment of the technique, the model can be updated using user usage data obtained in response to being presented with the highest ranked vertical search engines.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the automatic search engine recommendation technique, reference is made to the accompanying drawings, which form a part thereof, and which show by way of illustration examples by which the automatic search engine recommendation technique described herein may be practiced. It is to be understood that other embodiments may be utilized and structural changes may be made without departing from the scope of the claimed subject matter.

1.0 Automatic Search Engine Recommendation Technique.

The following paragraphs provide an introduction to, and an overview of, the automatic search engine recommendation technique described herein. Exemplary processes and an exemplary architecture for employing the technique, as well as an exemplary user interface, are also provided. Details of various implementations of the technique are described.

1.1 Introduction

Vertical search engines often provide more relevant results within their topics than general-purpose search engines. For this reason, users are more effective in finding results relevant to their search query when they use vertical search engines and general-purpose search engines in combination. For example, an expert user might search for videos on Microsoft Corporation's Live.com Video Search or on YouTube rather than on Microsoft Corporation's top-level Live.com search engine, thereby obtaining better results more quickly. The present technique automatically identifies vertical search engines appropriate to a given query and suggests them to the user. This informs the user of the availability of the vertical search engines and facilitates searching on them.

In one embodiment, the automatic search engine recommendation technique dynamically associates each user query with a set of matching vertical search engines, ordered by how well the verticals match the query. The query can be new. The technique automatically ranks known vertical search engines by suitability for a user's query, suitability to the user (e.g., by matching a profile) or suitability by some other criterion (e.g., novelty), and suggests the best vertical search engines to the user as a possible place to issue the query. A user interface for suggested vertical search engines can optionally include the top results from the suggested verticals, as well as a method such as a menu bar to select lesser ranked results.

1.2 Overview of the Automatic Search Engine Recommendation Technique

Figure 1:
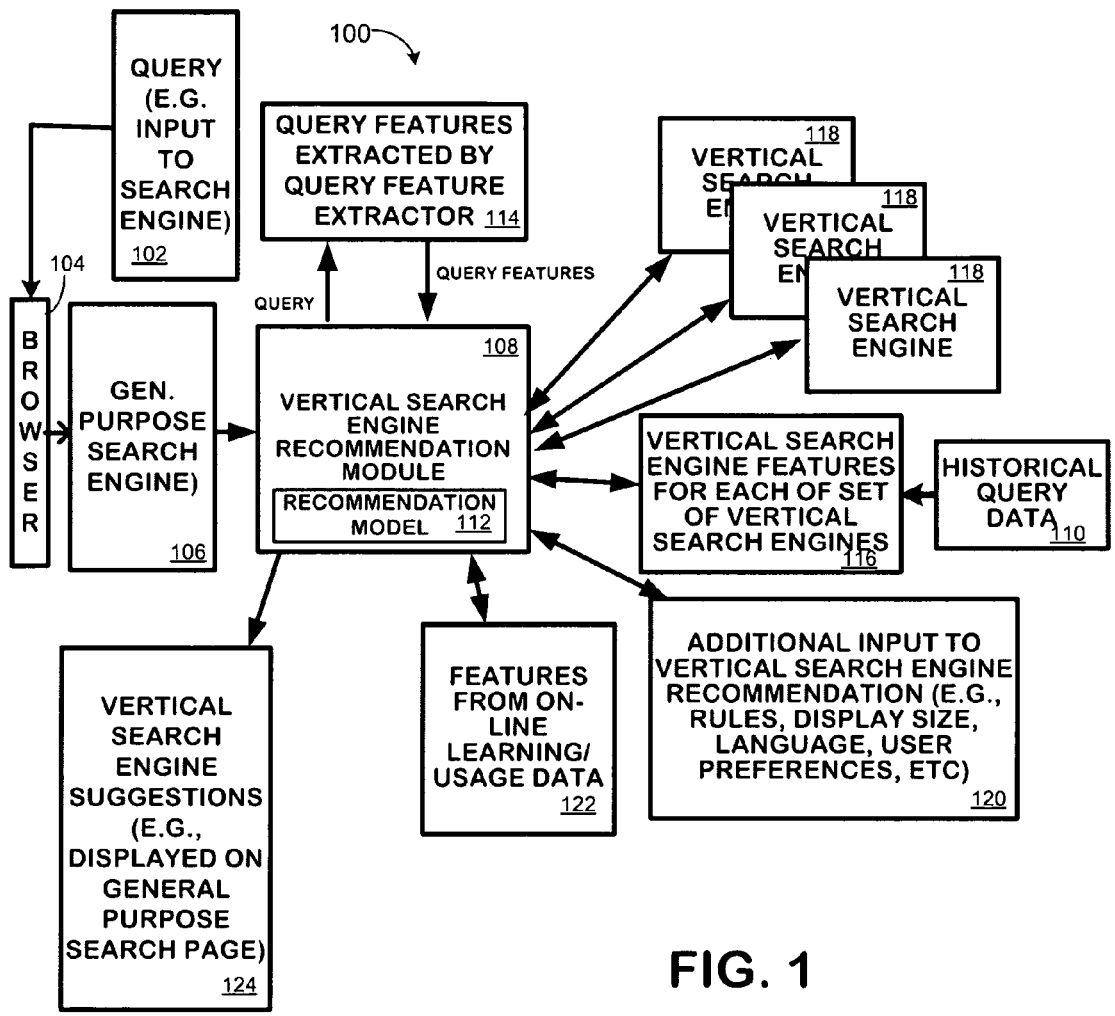
FIG. 1 is a schematic depicting an overview of the possible components employed in one embodiment of the automatic search engine recommendation technique.

This section provides an overview of the automatic search engine recommendation technique. To this end, FIG. 1 shows a schematic of the possible components of one embodiment 100 of the technique. In this embodiment, a query 102 is input into a vertical search recommendation module 108 which typically is resident on any type of computing device. The query 102 is typically input into the vertical search recommendation module via a search page/browser 104 of a non-topic specific search engine 106. For example, such a query would typically be put into the search page of a browser 104. The query is thus put into a search engine recommendation module 108 that will ultimately provide the user with vertical search engine recommendations 124 for the input query.

The search engine recommendation module 108 also obtains historical query data 110 for a set of vertical search engines 118. Features for each of these vertical search engines 118 can be extracted from this historical query data. For example, the distribution of query frequency (or query term frequency) can be used to extract a set of features for a given vertical search engine (or the general purpose search engine for that matter). These vertical search engine features 116 can ultimately be used to match the input query 102 with the most suitable vertical search engines 118. To this end, the search engine recommendation module 108 obtains features 114, 116 of both the query 102 and the vertical search engines 118. Such features might include, for example, queries issued, unigrams, bi-grams, geographic location of the user, results returned, lists (e.g. of movies or books), novelty for a particular user or novelty in general, a user profile, historical user click behavior (as a single user or on aggregate), rules (e.g. relating to the user's query history), and a query classifier, among others. Features of the input query 114 can be extracted using a feature extractor. Additional data input into the vertical search engine recommendation module 108 can also include features obtained from user usage data (herein also termed on-line learning) and various other data sources 120 such as, for example, lists of information (e.g., movies, books, holidays and so forth), grammar rules, user display characteristics, user preferences, language, and so on. As mentioned above, in one embodiment rules 120 can be used in addition to features. An example of a rule could be "if a query consists entirely of words in the French dictionary, show a French language vertical."

Using the extracted features of the vertical search engines, features from on-line learning and the other input data, a model 112 for automatically recommending vertical search engines can be created. In one embodiment of the technique, this model 112 is a list of each vertical search engine with a set of representative features for this vertical search engine in the form of a feature vector. For example, a simple feature vector might be:

| Feature | Weight |
|---|---|
| "watch" | .1 |
| "zune" | .01 |
| "jewelry" | .2 |
| query: "bargain books" | .1 |
| query: "car seat" | .3 |
| location | U.S. |
| language | en-us |
| isRepeatedQueryInSession | true |

As can be seen from the sample feature vector, some of its components can be assigned weights to be used in determining which vertical search engines to recommend.

Using the extracted features 114, 116 of both the query 102 and the vertical search engines 118, as well as other data 120 possibly, a recommendation of the most suitable vertical search engines 124 is computed. In one embodiment of the technique, the most similar vertical search engines to the query are ranked and/or selected as the highest for recommendation, although other methods of determining a recommendation could be used. In one embodiment this computation is based on the similarity of the features 114 of the query 102 and the features 116 of each of the vertical search engines 118. In one embodiment of the technique, the computation of similarity of the features is performed by comparing the feature vector of the query with the feature vector of each vertical search engine. Additionally, in one embodiment, the technique also determines the similarity of the features of the query to the features of the general purpose search engine and does not recommend any vertical search engines if the general purpose search engine has a greater similarity with the query than the vertical search engines. The computed recommendation is provided to the user, such as, for example, by updating the search page of the non-topic specific search engine 106 with the computed vertical search engine recommendations/suggestions 124.

A high level overview having been provided the following sections describe exemplary processes and an architecture for employing the automatic search engine recommendation technique. This is followed by details of some exemplary embodiments and a description of an exemplary user interface (UI).

1.3 Exemplary Processes Employed by the Automatic Search Engine Recommendation Technique.

Figure 2:
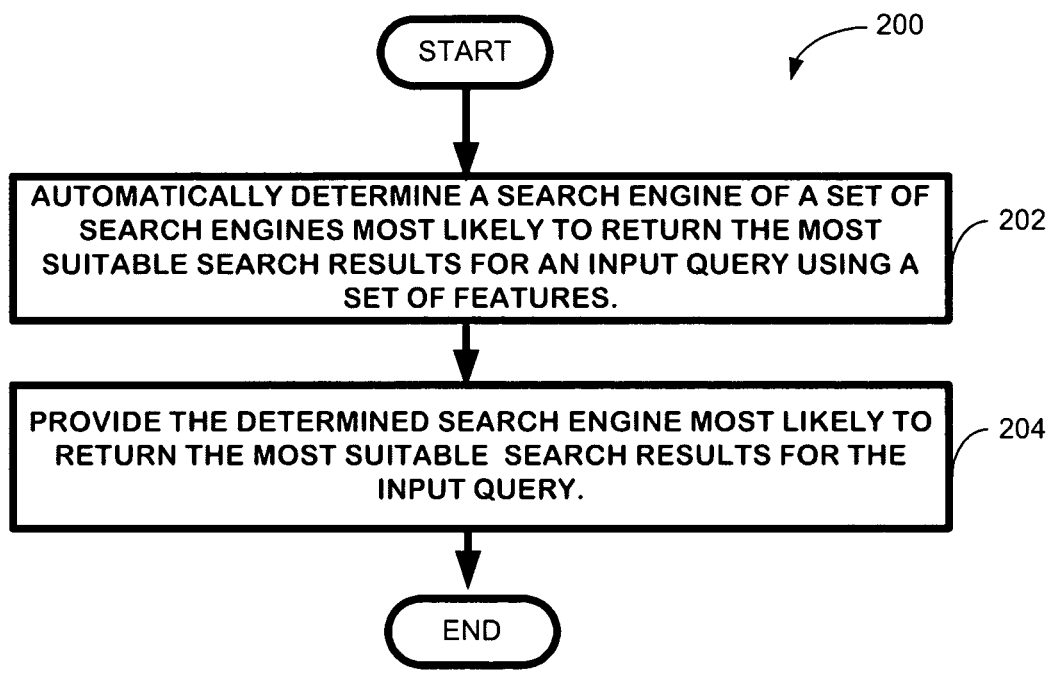
FIG. 2 is a flow diagram depicting an exemplary embodiment of a process for employing the automatic search engine recommendation technique described herein.

A very high level exemplary process 200 for employing the automatic search engine recommendation technique is shown in FIG. 2. As shown in FIG. 2, block 202, the automatic search engine recommendation technique automatically determines a search engine of a set of search engines that are most likely to return suitable results for an input query using a set of features. The determined search engine most likely to return suitable search results for the input query is then provided to the user, for example it is displayed to the user, or the user is sent to the search engine that is most suitable for the input query, as shown in block 204.

Figure 3:
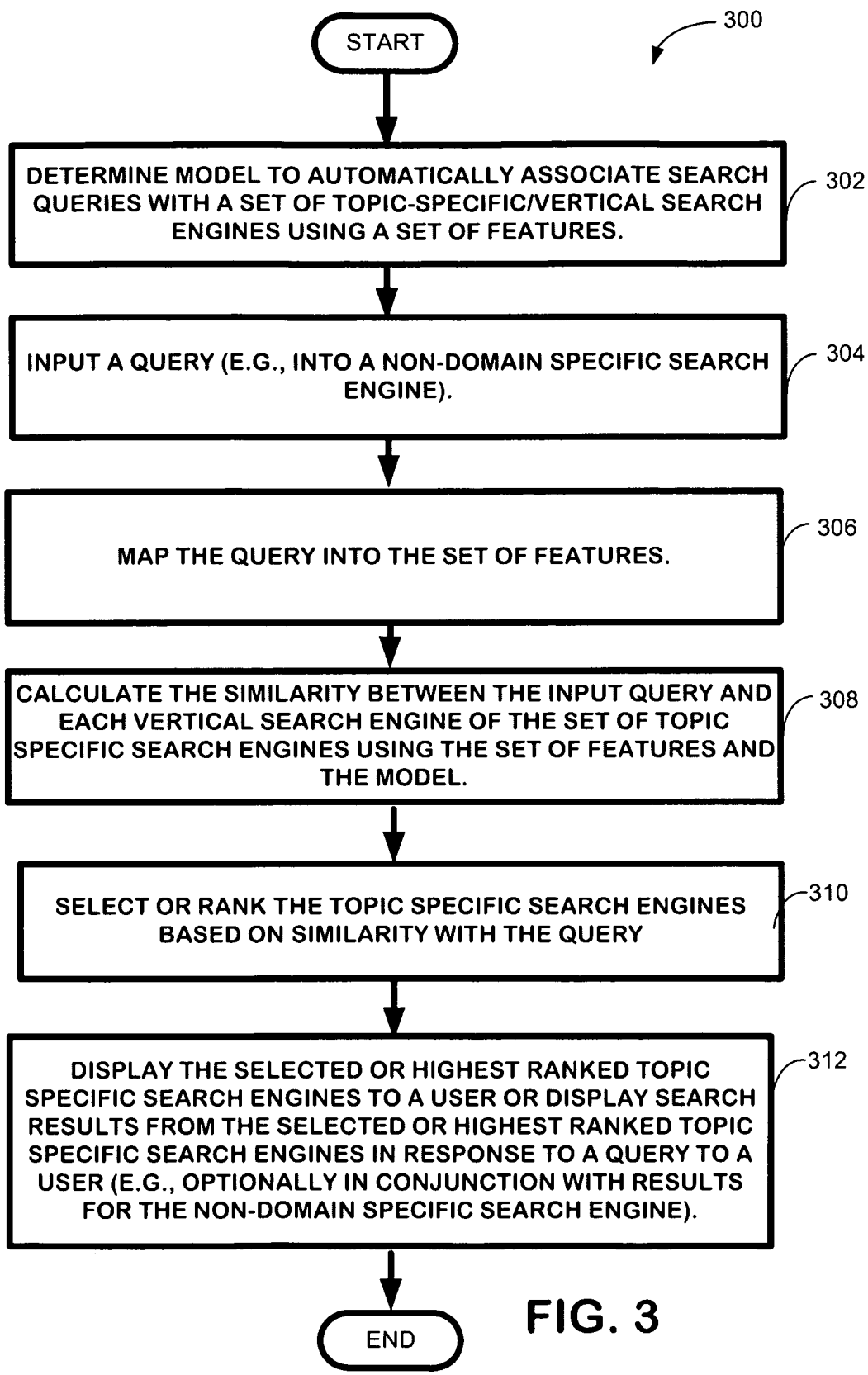
FIG. 3 is a flow diagram depicting another exemplary embodiment of a process for employing the automatic search engine recommendation technique described herein.

Another more detailed exemplary process 300 for employing the automatic search engine recommendation technique is shown in FIG. 3. As shown in block 302, a model is determined to automatically associate search queries with a set of topic-specific search engines using a set of features. This model can be created, for example, by creating a list of known vertical search engines, including data about each vertical search engine to which an input query can be compared. The data for each vertical search engine can be obtained, for example, from users who allow a search engine to monitor their query and search behaviors. The data can also be obtained from query logs from the vertical search engines themselves. Such data for a vertical search engine may include, for example, the set of queries issued over a window of time, along with frequency of each query or the frequency of the query terms. Additional data that can be useful includes query frequencies by date, search engine traffic by date, and information about how queries are changing over time. Features may be, for example, queries issued, unigrams and bi-grams of queries or results returned, geographic location of user, language preferences, the operating system of the user, a user profile or history, a user's social network, browser add-ins installed, and so forth. The features for each vertical search engine can be represented as a feature vector if desired.

Once the model to associate user search queries with a set of vertical search engines is acquired it can be used to automatically recommend vertical search engines in response to an input query. To this end, a new query is input (e.g., into a non-topic-specific search engine), as shown in block 304. The new query is mapped to the same set of features that the vertical search engines are, as shown in block 306. Again, the input query can also be represented as a feature vector.

As shown in block 308, the similarity between each vertical search engine of the set of vertical search engines and the input query is computed using the set of features. In one embodiment this is done by comparing the feature vectors of the input query and each of the feature vectors for the vertical search engines. The vertical search engines are then selected or ranked based on the similarity computations, as shown in block 310. For example, in one embodiment, a cosine similarity measure can be used to determine the similarity between features of the query and the vertical search engine (s). In one embodiment, such a cosine similarity metric has the form $$\text{similarity}(\vec{x}, \vec{y}) = \frac{\sum_{i=1}^{n} x_i \cdot y_i}{\sqrt{\sum_{i=1}^{n} x_i^2} \sqrt{\sum_{i=1}^{n} y_i^2}}$$

Additional embodiments can include the use of other similarity measures based on probabilistic or language models, or based on learned ranking models.

The selected or highest ranked (e.g., most similar to the query) vertical search engines are then displayed to a user or the results to the query from the selected or highest ranked vertical search engines are displayed to the user, as shown in block 312. These results can be displayed with results received to the query from the non-topic-specific search engine in which the query was entered.

Figure 4:
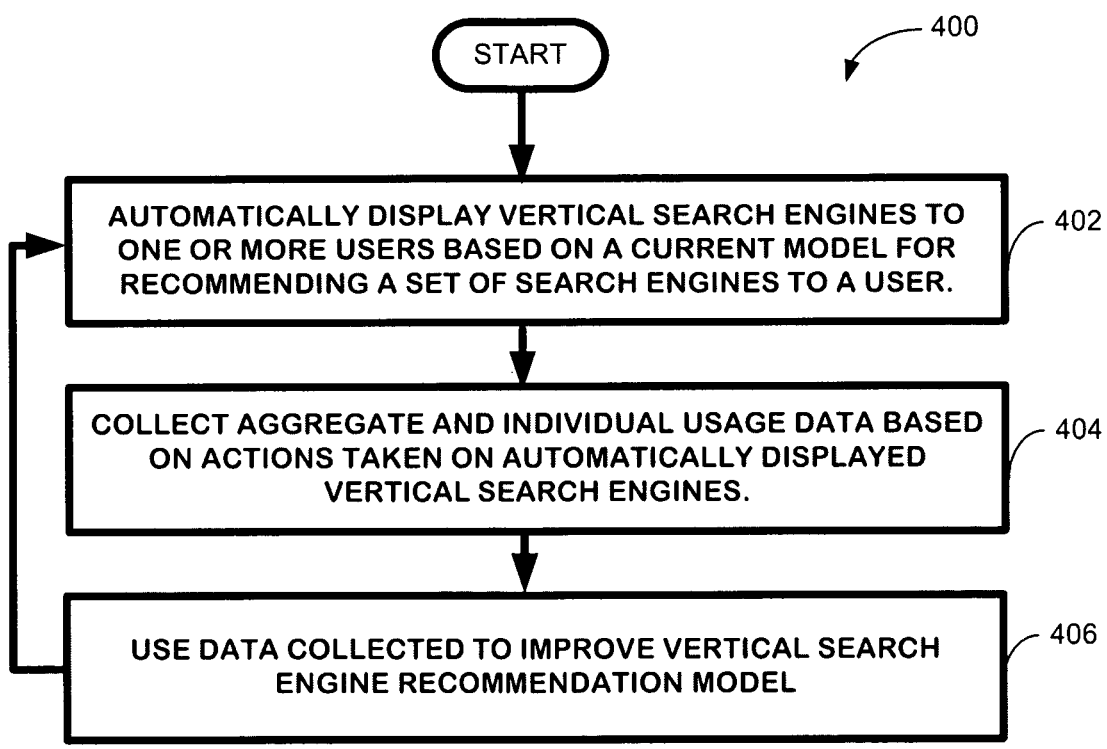
FIG. 4 is yet another flow diagram depicting another exemplary embodiment of a process for employing the automatic search engine recommendation technique wherein a model for recommending vertical search engines is updated using user usage data.

FIG. 4 depicts an embodiment of the automatic search engine recommendation technique that updates a vertical search engine recommendation model based on usage data collected. In essence, one embodiment of the technique uses usage data to validate the selection or the similarity ranking between the query and a given vertical search engine based on the behavior of the user on selecting and interacting with a recommended vertical search engine. More specifically, the vertical search recommendation is displayed to one or more users based on a current vertical search recommendation model, as shown in block 402 of FIG. 4. Aggregate and/or individual usage data is collected based on actions taken on displayed vertical search engines (block 404). This collected data is then used to improve the vertical search engine recommendation model, as shown in block 406. There are various possibilities on how usage data can be fed back into the model to improve it. For example, usage data (e.g. click behavior) can be used to modify the weights associated with a vertical search engine's feature vector. Alternately, the query-specific user data can be used as an additional feature in the vertical's feature vector. Yet another possibility is to use the data in an additional step in a classifier, e.g. as a component of a multi-stage classifier, or as a prior probability in a Bayesian classifier. Any of these possibilities can be accomplished on a per-user or aggregate basis.

Figure 5:
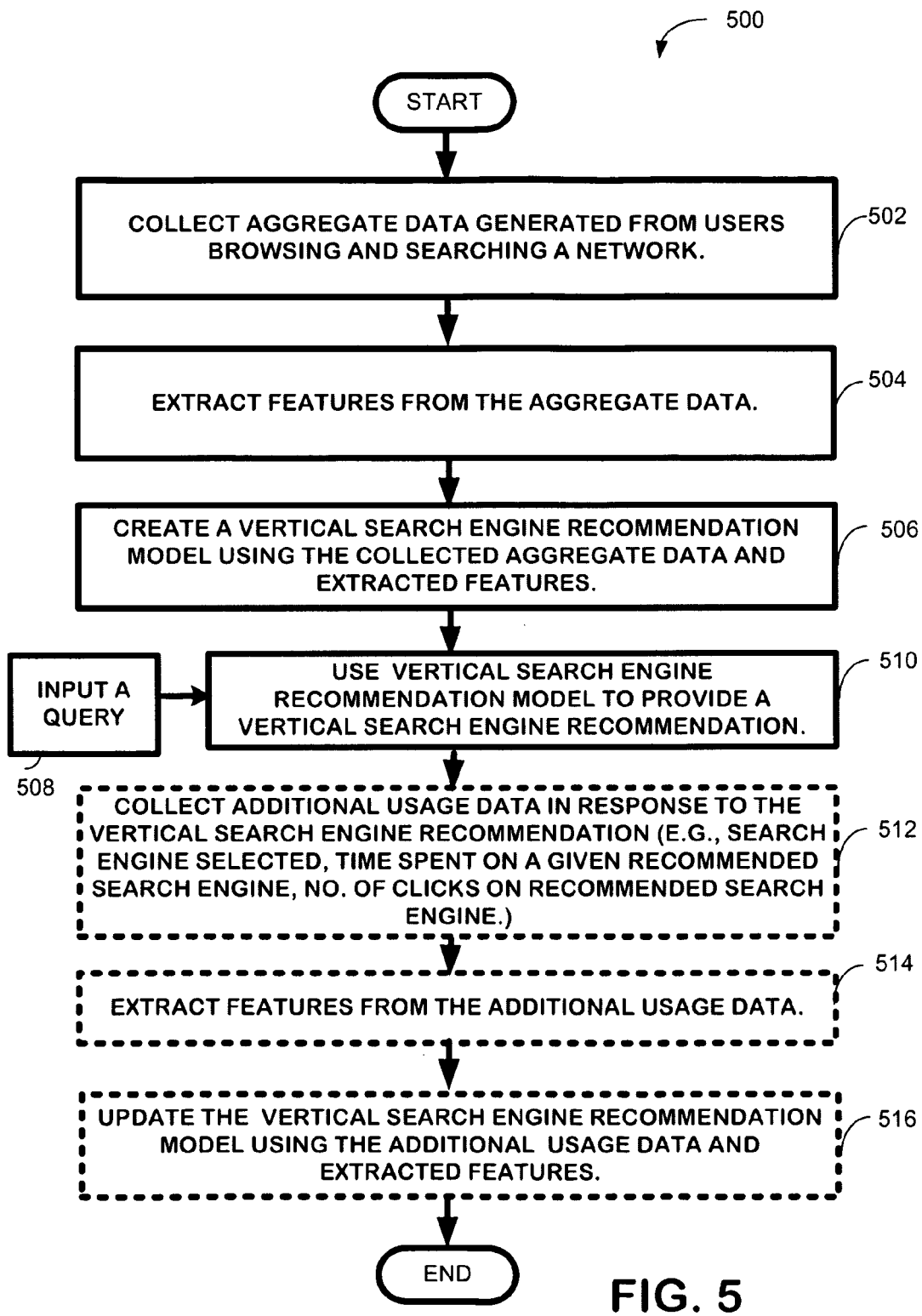
FIG. 5 is still another flow diagram depicting another exemplary embodiment of a process for employing the automatic search engine wherein a model for recommending vertical search engines is created and then updated using user usage data.

FIG. 5 depicts a variation of the process shown in FIG. 4. In this embodiment 500 the aggregate data of users browsing and searching a collection of information such as the Web (or other searchable body) is collected (block 502). Features are then extracted from this aggregate data (block 504). A vertical search engine recommendation model is then created using the aggregate data and the extracted features (block 506). Once this model is created, a query can be input (as shown in block 508), and vertical search engines can be recommended for the input query using the created model (block 510). Additional usage data can also optionally be collected in response to the vertical search engine recommendation (block 512). For example, the additional usage data can include the vertical search engines the user selects, the time spent on a given vertical search engine, or the number of clicks a user executes on a given vertical search engine. Features from this additional usage data can be extracted (block 514) and the vertical search engine recommendation model can be updated with the new usage data and extracted features (block 516).

1.4 Exemplary Architecture Employing the Automatic Search Engine Recommendation Technique.

Figure 6:
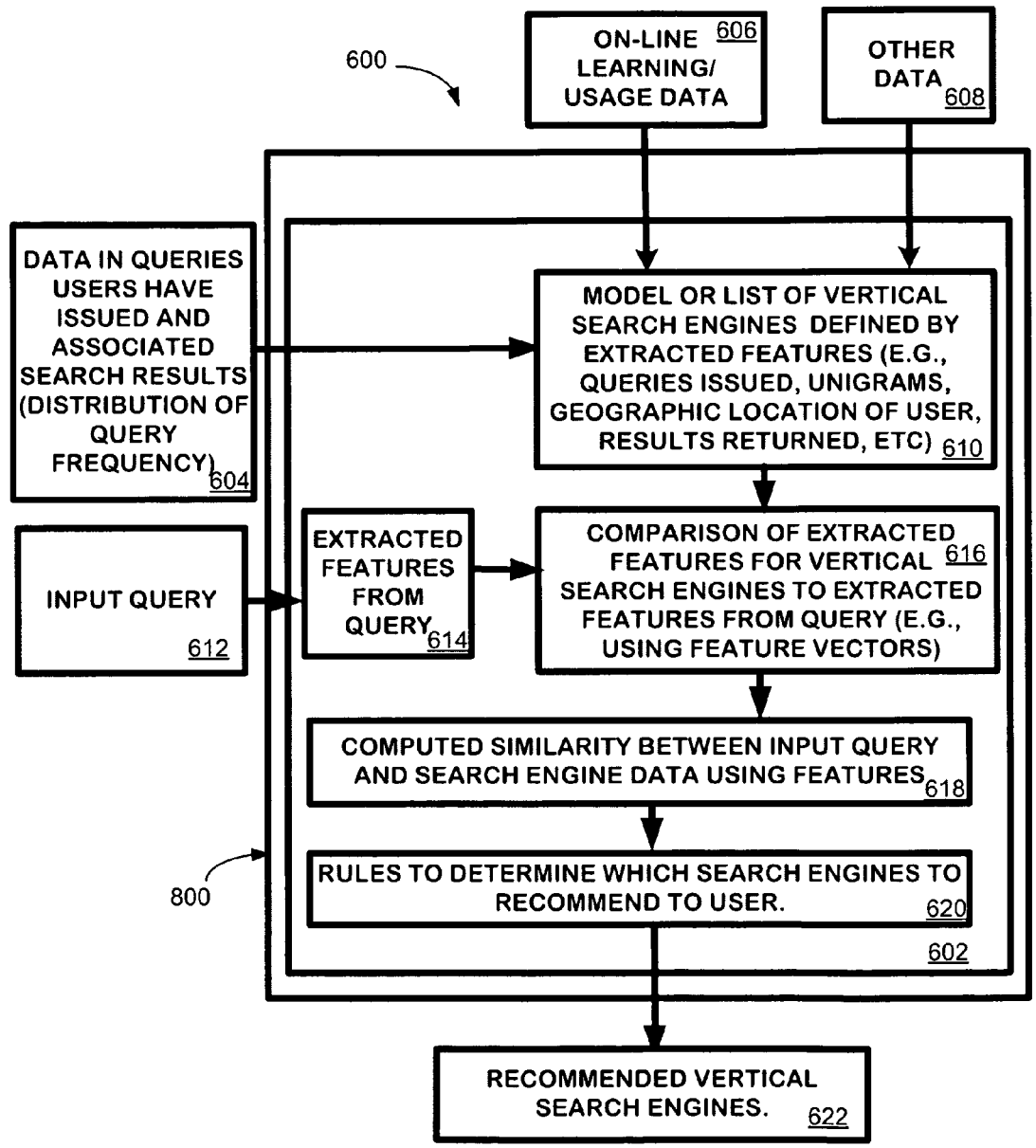
FIG. 6 is an exemplary architecture in which one embodiment of the automatic search engine recommendation technique can be practiced.

FIG. 6 provides one exemplary architecture 600 in which one embodiment of the automatic search engine recommendation technique can be practiced. As shown in FIG. 6, the architecture 600 employs a search engine recommendation determination module 602, which typically resides on a general computing device 800 such as will be discussed in greater detail with respect to FIG. 8. The search engine recommendation determination module 602 ultimately computes a recommended set of vertical search engines 622 in response to an input query 612.

In order to compute the recommended set of vertical search engines 622 data for a query 612, historical data regarding user queries and associated search results 604, usage data 606 in response to vertical search engines presented, and other data 608 (e.g. user preferences, grammar rules, geographic location of user, and so forth) is used to create a model for the recommendation of vertical search engines (block 610) based on any given query. For example, in one embodiment this is done by creating a list of the vertical search engines where each vertical search engine in the list is represented by a set of features, or optionally a feature vector.

Once the model/list is obtained a new query 612 can be input. Features are also extracted from the query, as shown in block 614. Additionally, the query can also be represented as a feature vector. The extracted features for each of the vertical search engines, and the extracted features from the search query are compared to determine which vertical search engines should be recommended, for example, based on similarity (block 616). For example, this can be done by comparing the feature vector of the query with each of the feature vectors of each of the vertical search engines. The computed similarity between the input query and the search engine data (block 618) can then be input into a set of rules that determine which vertical search engines to recommend to the user based on the input query (block 620). For example, the recommendation might be based on a similarity threshold wherein only vertical search engines with a similarity above the threshold are recommended. Or the recommendation might be based on recommending only a given number of vertical search engines, or the recommendation might be based on a threshold and a given number of vertical search engines. The rules are applied using the computed similarity data to output a recommended set of one or more vertical search engines (block 622). In one embodiment, this recommended set of vertical search engines is output in conjunction with results returned from a general purpose, non-topic-specific search engine into which the input query was originally input.

1.5 Details of Exemplary Embodiments of the Technique

An overview of the technique and exemplary processes and an exemplary architecture having been described, the following sections provide additional details on the implementation of various embodiment of the automatic search engine recommendation technique.

1.5.1 Data Acquisition of Vertical Search Engine Data

In one embodiment, the automatic search engine recommendation technique uses a list of known vertical search engines, including data about each. The initial discovery of vertical search engines and their associated features can occur in many ways. For example, developers of a vertical search engine can provide their vertical search engine and associated features or feature vector. Alternatively, a list of vertical search engines can be compiled based on vertical search engines encountered by a general purpose search engine. The data for each search engine can be obtained from users who opt in to customer experience improvement programs that allow their usage data to be gathered. It can also be obtained from query logs from the vertical search engines themselves. One useful set of data for a vertical search engine is the set of queries issued over a window of time, along with frequency of each query. Additional data that can be useful includes query frequencies by date, search engine traffic by date, and information about how queries are changing over time. For example, a news vertical would have been a good suggestion for a query about Democratic presidential candidate Bill Richardson before he dropped out of the Democratic primary process in January 2008, but a month or two later, the news vertical would have been a poor suggestion. This situation can be detected by observing that queries related to Bill Richardson declined in frequency on news verticals after January 2008. Another source of data can be the types of results that users typically click on for a given query. For example, if a user clicks on results from a medical repository for a query, it is possible that a medical search engine could be a good federation source. These clicks can come on the results for a particular query, or on results for other queries issued in the same session.

1.5.2 Representation of Vertical Search Engines in Feature Space

To construct the model or list of the vertical search engines, in one embodiment of the automatic search engine recommendation technique, information about historical queries on the vertical search engines are mapped into a feature space, so that each vertical search engine is represented as a feature vector. For example, the feature space may contain information about historical unigrams, bi-grams, query lengths, and query languages, among other features.

In one embodiment of the automatic search engine recommendation technique, queries can be augmented by similar queries, with similarity determined from session data, frequency of clicks for that query on various URLs, common terms or substrings, edit distance, or other similarity measures. Additional useful features may arise from a bipartite graph of queries and URLs, where an edge represents historical clicks on a given URL for a given query, weighted by frequency. For example, in a bipartite graph, queries can be represented as feature vectors, where the features are relative frequencies of clicks on URLs. A similarity metric such as the cosine metric mentioned above, or another similarity metric can be applied.

Information about the vertical search engines can also be obtained from other sources, such as the text of URLs linking to them, descriptive text on their pages, and hand-authored rules and features. The model can incorporate other sources of information about the user's possible intentions, such as queries issued earlier in the session, or their explicit feedback about the types of vertical engines or the specific search engines they prefer for certain topics.

1.5.3 Representation of Input Query in Feature Space

At query time, in one embodiment of the automated search engine recommendation technique, the technique maps the user query into the same feature space as the vertical search engines and calculates a similarity metric between the query and each vertical.

1.5.4 Similarity Comparison of Vertical Search Engines to Input Query in Feature Space.

In one embodiment of the technique, the known vertical search engines are ranked by similarity to the query, and the most similar vertical search engines are displayed to the user. In one embodiment, the number of recommended vertical search engines is controlled by a similarity threshold, a maximum number of recommended verticals, a set of rules, or some combination of these.

Vertical search engines fit loosely into a natural hierarchy based on specificity. For example, a search engine for rock climbing is more specific than a search engine for both rock and ice climbing. A rock and ice climbing vertical is in turn more specific than a search engine for outdoor sports. This hierarchy of vertical search engines can be constructed automatically from the feature vectors representing the vertical search engine by clustering techniques and analysis of the feature vectors representing the verticals. When the technique recommends a vertical search engine to the user, the recommendation can also include vertical search engines that would allow more general and more specific searches in the same topic, or that would cover a diversity of different topics.

1.5.5 On-Line Learning

In one embodiment of the technique, as previously discussed, the model can be updated using user usage data obtained in response to being presented with the highest ranked vertical search engines. For example, the additional usage data can include the vertical search engines the user selects, the time spent on a given vertical search engine, or the number of clicks a user executes on a given vertical search engine. If the user has minimized or expanded the results from the search engine in the UI, data from "pinning" a vertical search engine so that it persists across queries or selecting the vertical search engine from a menu can also be used. Features from this additional usage can be extracted and the vertical search engine recommendation model can be updated with the new usage data and extracted features.

1.5.6 Statistical Smoothing and Sparsity of Query Volume

Statistical smoothing can be applied to the feature vectors representing the vertical search engines, or to the feature vector representing the query. For example, one metric that can be used is the percentage of the time a given vertical was shown in the UI and the user clicked on something in the vertical. Algebraically, this can be expressed as $$(\# \text{ clicks})/(\# \text{ of impressions})$$

However, if the number of impressions is zero, the quotient is undefined, and if the number of impressions is nearly zero, the quotient is uninformative. This can be smoothed (in a simple way) by adding a small positive value $\lambda$ to the numerator and denominator.

$$(\# \text{ clicks}+\lambda)/(\# \text{ impressions}+\lambda)$$

In one embodiment, the automatic search engine recommendation technique can improve accuracy and account for sparsity and variations in query volume across the different verticals, for example by using Latent Semantic Analysis or Probabilistic Latent Semantic Analysis.

1.6 User Interface

Figure 7:
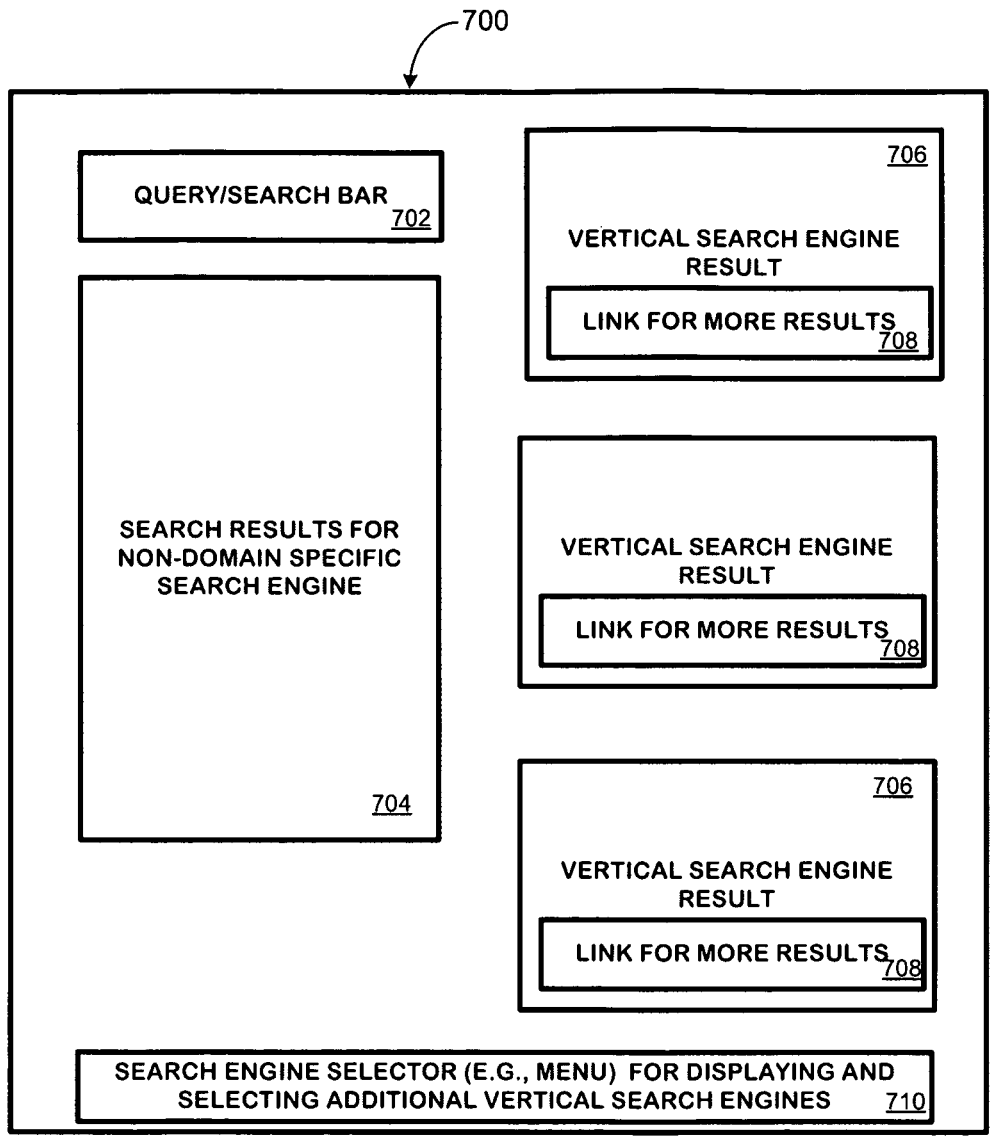
FIG. 7 is an exemplary user interface of one embodiment of the automatic search engine recommendation technique described herein.

FIG. 7 provides an exemplary UI 700 employed in one embodiment of the technique. The UI 700 typically is displayed on the display of a computing device and interfaces with a general purpose, non-topic specific search engine and a search engine recommendation determination module such as was previously discussed. The UI 700 includes a query search bar 702 into which a user types a search query. Search results for the general purpose, non-domain specific search engine are displayed in a pane 704. In conjunction with the results for the non-domain specific search engine one or more of the recommended search engines are displayed in separate windows 706 for each recommended vertical search engine. The separate windows for each of the recommended vertical search engines 706 can include hyperlinks to additional query results from the suggested verticals 708. In addition, one implementation of the interface includes a search engine selector 710, such as, for example, a menu bar to allow users to view results from verticals that received a lower ranking than the ones displayed in windows 706.

The user interface 700 can also include top results from each recommended vertical search engine. It can allow users to "pin" or tag their preferred vertical search engines so that these pinned vertical search engines will be given greater weight when determining which vertical search engines to recommend. Or the user can also eliminate vertical search engines they do not like so that these vertical search engines will not be recommended to the user. Pinning and elimination behavior can be used by the technique to make better vertical search suggestions, either on an individual basis or across multiple users.

Additionally, in one embodiment of the technique, the vertical search engines can be given any degree of control over what is displayed from their engine for a given query, up to and including rendering the entire user interface for a suggested vertical search engine.

2.0 The Computing Environment

The automatic search engine recommendation technique is designed to operate in a computing environment. The following description is intended to provide a brief, general description of a suitable computing environment in which the automatic search engine recommendation technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 8:
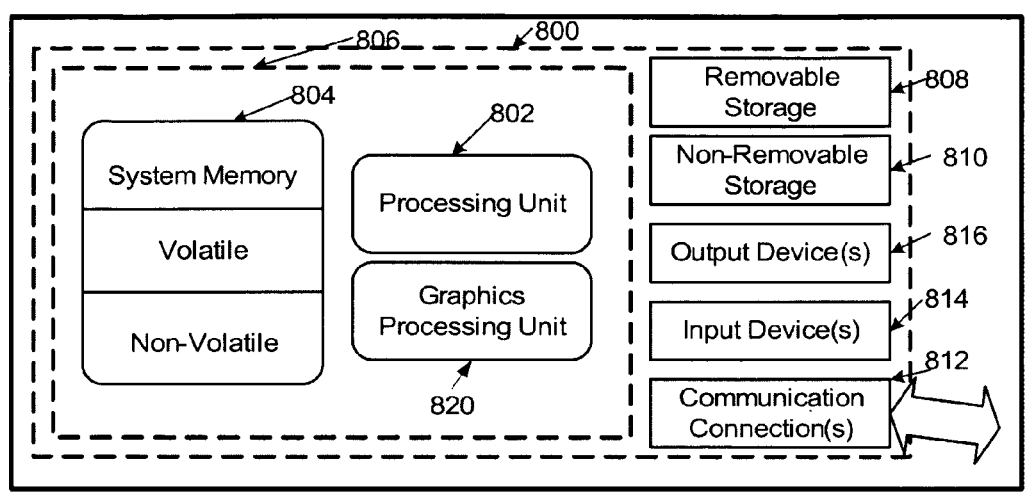
FIG. 8 is a schematic of an exemplary computing device which can be used to practice the automatic search engine recommendation technique.

FIG. 8 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 8, an exemplary system for implementing the automatic search engine recommendation technique includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 also contains communications connection(s) 812 that allow the device to communicate with other devices and networks. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 may have various input device(s) 814 which includes a display and may include a keyboard, mouse, pen, camera, touch input device, and so on. Output device(s) 816 such as speakers, a printer, and so on may also be included. All of these devices are well known in the art and need not be discussed at length here.

The automatic search engine recommendation technique may be described in the general context of computer-executable instructions, such as program modules, being executed by a computing device. Generally, program modules include routines, programs, objects, components, data structures, and so on, that perform particular tasks or implement particular abstract data types. The automatic search engine recommendation technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for recommending search engines, comprising;
    automatically determining a search engine most likely to return the most suitable search results for an input query using a set of features, wherein automatically determining a search engine, further comprises:
        collecting aggregate data generated from users issuing queries on a network;
        characterizing each topic-specific search engine of a list of known topic specific search engines and at least one non-topic specific search engine with a set of features using the aggregate data;
        determining an on-line search engine ranking model that comprises user usage data and that is hosted on the network to automatically associate search queries with the list of known topic-specific search engines and the at least one non-topic specific search engine using the collected aggregate data and features;
        mapping a received query into the same set of features used to characterize each of the known topic-specific search engines and the at least one non-topic specific search engine;
        calculating the similarity between the received query and each topic-specific search engine of the list of topic-specific search engines and the at least one non-topic specific search engine using the similarity of the set of features of the query, each topic specific search engine and the at least one non-topic specific search engine, as well as the on-line search engine ranking model;
        selecting a topic-specific search engine or a non-topic specific search engine based on the greatest similarity of the features of the topic-specific search engine and the at least one non-topic specific search engine with the features of the received query using a similarity threshold that measures the similarity of the set of features of the query, each topic-specific search engine and the at least one non-topic specific search engine;
        recommending the selected search engine as the search engine most likely to return the most suitable search results for the received query to a user.

2. The computer-implemented process of claim 1 further comprising:
    automatically determining additional search engines most likely to return suitable search results for the received query using the set of features; and
    selecting the additional determined search engines most likely to return suitable search results for the received query; and
    recommending the selected search engines to a user.

3. The computer-implemented process of claim 1, wherein the search engines are ranked based on suitability to the user based on a user profile.

4. The computer-implemented process of claim 2, further comprising updating the on-line search engine ranking model, comprising:
    automatically displaying the recommended search engines to one or more users based on a current on-line search engine ranking model;
    collecting usage data based on actions taken on the automatically displayed search engines over the network; and
    using the usage data collected to update the current on-line search engine ranking model.

5. The computer-implemented process of claim 1, wherein one of the features is language of the query.

6. The computer-implemented process of claim 1 further comprising determining the set of features using a distribution of query term frequencies for each of the set of topic-specific search engines.

7. A computer-implemented process for automatically recommending one or more search engines to a user, comprising:
    collecting aggregate data generated from users issuing queries on a network;
    extracting a set of features that characterize each of a list of known vertical search engines from the aggregate data;
    creating an on-line vertical search engine recommendation model that comprises user usage data and that is hosted on the network using the aggregate data and the extracted set of features;
    receiving a query and mapping the received query into the same set of features used to characterize each of the known vertical search engines;

providing a recommended set of vertical search engines most relevant to the input query using the set of features of the query, the sets of features of the vertical search engines, and the model by computing the similarity of the features of the query and the features of each of the vertical search engines and recommending one or more vertical search engines that meet a similarity threshold based on the similarity of the features of the input query and the features of each of the vertical search engines.

8. The computer-implemented process of claim 7, further comprising:
augmenting the aggregate data of the input query with similar queries and associated search results.

9. The computer-implemented process of claim 7, further comprising:
providing the recommended set of vertical search engines by computing the similarity between each vertical search engine and the input query and only recommending vertical search engines that meet a similarity threshold based on a cosine similarity metric that measures the similarity of the features of the input query and the features of each of the vertical search engines.

10. The computer-implemented process of claim 7, further comprising:
collecting additional usage data on the recommended set of vertical search engines over the network;
extracting features from the additional usage data; and
updating the on-line vertical search engine recommendation model using the extracted features from the additional usage data on the recommended set of vertical search engines.

11. A system for automatically determining the most suitable topic-specific search engines for a query, comprising:
a computing device comprising a processor and a memory;
a computer program stored in the memory comprising program modules executable by the computing device, wherein the computing device is directed by the program modules of the computer program to,
compute an on-line vertical search engine recommendation model, hosted on a network, for predicting the best suited vertical search engines for a query using features from historical data regarding user queries and associated search results for a set of known vertical search engines comprising extracting a set of representative features for each vertical search engine;
receive a new query;
extract the same set of representative features as used to characterize the vertical search engines from the new query;
using the on-line vertical search engine recommendation model to compare the extracted features from the new query to features of each vertical search engine and a general purpose search engine to determine similarity between the features of the query, the features of the each vertical search engine and the features of the general purpose search engine;
input the computed similarity between the input query and the vertical and general purpose search engines into a set of search engine recommendation rules that determine which of the vertical search engines or the general purpose search engine to recommend to the user based on the received query; and
apply the rules using the computed similarity data to output a recommended set of one or more vertical search engines or a general purpose search engine.

12. The system of claim 11 wherein each vertical search engine in the list, the general purpose search engine and the query is each represented by a feature vector.

13. The system of claim 12, further comprising computing the similarity by comparing the similarity of the feature vector of the query with the feature vector of each vertical search engine and a feature vector of the general purpose search engine and using a feature similarity threshold to determine which search engine to recommend.

14. The system of claim 11, further comprising displaying the output of the recommended set of one or more vertical search engines in conjunction with the search results of the general purpose search engine in response to the query.

15. The system of claim 11 wherein the on-line vertical search engine recommendation model is updated using user actions on the recommended set of one or more vertical search engines.

16. The system of claim 11 further comprising a user interface comprising:
a search bar pane for entering a query;
a search results pane for displaying results returned by the general purpose search engine in response to the query;
one or more vertical search engine panes for displaying each recommended vertical search engine, wherein each vertical search engine pane further comprises a link for linking to search results for the input query for that vertical search engine; and
a search engine selector which allows the user to display and select vertical search engines other than a displayed recommended vertical search engine.

17. The system of claim 16 further comprising a module for incorporating user actions to improve the computation of the data similarity and the application of the rules.

18. The system of claim 11 wherein the set of rules for recommendation further comprise recommending only vertical search engines with a similarity of the features of each vertical search engine to the features of the input query over a given feature similarity threshold.

19. The system of claim 11 wherein the set of rules further comprise recommending only a given number of vertical search engines.

20. The system of claim 11, further comprising:
representing a hierarchy of the vertical search engines by automatically clustering feature vectors representing the vertical search engines.

* * * * *